United States Patent
Maitra

(10) Patent No.: US 9,519,606 B2
(45) Date of Patent: Dec. 13, 2016

(54) NETWORK SWITCH

(71) Applicant: GigaIO Networks, Inc., San Diego, CA (US)

(72) Inventor: Jayanta Kumar Maitra, San Diego, CA (US)

(73) Assignee: GigaIO Networks, Inc., San Diego, CA (US)

( * ) Notice: Subject to any disclaimer, the term of this patent is extended or adjusted under 35 U.S.C. 154(b) by 351 days.

(21) Appl. No.: 14/336,702

(22) Filed: Jul. 21, 2014

(65) Prior Publication Data
US 2015/0026384 A1 Jan. 22, 2015

Related U.S. Application Data

(60) Provisional application No. 61/857,077, filed on Jul. 22, 2013.

(51) Int. Cl.
*G06F 13/40* (2006.01)
*G06F 12/10* (2016.01)
*G06F 13/38* (2006.01)

(52) U.S. Cl.
CPC ....... *G06F 13/4022* (2013.01); *G06F 12/1081* (2013.01); *G06F 13/404* (2013.01); *G06F 13/4027* (2013.01); *G06F 13/385* (2013.01)

(58) Field of Classification Search
None
See application file for complete search history.

(56) References Cited

U.S. PATENT DOCUMENTS

| | | | | |
|---|---|---|---|---|
| 8,917,734 B1* | 12/2014 | Brown | .................... | H04L 49/35 370/400 |
| 2005/0117578 A1* | 6/2005 | Stewart | ............... | H04L 49/3009 370/389 |
| 2009/0089464 A1* | 4/2009 | Lach | .................... | G06F 13/4022 710/62 |
| 2011/0202701 A1* | 8/2011 | Maitra | ................ | G06F 13/4022 710/308 |
| 2012/0005392 A1* | 1/2012 | Yagi | ...................... | G06F 13/409 710/313 |

(Continued)

OTHER PUBLICATIONS

Regula, Jack. "Using Non-transparent Bridging in PCI Express Systems". PLX Technology, Inc. Jun. 1, 2004.*

(Continued)

*Primary Examiner* — Thomas J Cleary
(74) *Attorney, Agent, or Firm* — Nields, Lemack & Frame, LLC

(57) ABSTRACT

A network switch, based on the PCI Express protocol, is disclosed. The switch is in communication with a processor, local memory and includes a plurality of non-transparent bridges and, optionally transparent bridges, leading to PCI Express endpoints. By configuring the non-transparent bridges appropriately, the network switch can facilitate simultaneous communication between any two sets of servers without needing to store any data in the local memory or FIFO resources of the switch. For example, the network switch may configure the non-transparent bridges so as to have access to the physical memory of every server attached to it. It can then move data from the memory of any server to the memory of any other server.

18 Claims, 7 Drawing Sheets

(56) References Cited

U.S. PATENT DOCUMENTS

2014/0281069 A1* 9/2014 Mandapuram ...... G06F 13/4022
710/104

OTHER PUBLICATIONS

"Multi-Host System and Intelligent I/O Design with PCI Express". PLX Technology, Inc. 2004.*
Kong, Kwak. "Non-transparent Bridging with IDT 89HPE32NT24G2 PCI Express® NTB Switch". Application Note AN-724. Integrated Device Technology, Inc. Sep. 30, 2009.*

* cited by examiner

NETWORK SWITCH

This application claims priority to U.S. Provisional Patent Application Ser. No. 61/857,077, filed Jul. 22, 2013, the disclosure of which is incorporated herein by reference in its entirety.

BACKGROUND OF THE INVENTION

Over time, various interconnects and protocols have been developed to address the various interconnectivity issues associated with computing. Several examples of interconnectivity include server-based clustering, storage networks, intranet networks, and many others.

Today, it is common for a single installation to have a plurality of interconnects for these various interconnectivity solutions. For example, FIG. 1 shows a typical environment where a plurality of servers 10a, 10b, 10c are connected to each other via high speed Ethernet, such as through a switch 20. This switch 20 allows the various servers to exchange data with each other. This switch 20 may also connect to a second switch or gateway 30, which provides a second interface, such as FibreChannel to the storage devices 40a, 40b.

In another embodiment, such as that shown in FIG. 2, a cluster switch 50 is used to connect a plurality of servers, such as mail server 60a, application server 60b and data base server 60c together.

FIG. 3 shows a typical computer architecture, showing the interconnect between a plurality of servers, such as servers 110a-110f. In this embodiment, each server 110 has a PCI Express bridge device. These devices each communicate with a respective switch 120a,120b, each of which has a dedicated PCI Express bridge device for each server. As shown in FIG. 4, each of the switches 120a, 120b may include an upstream link 124 and a number of downstream links 123. Internal to each switch 120 is a plurality of PCI Express bridge devices 121, which may be operating in transparent or non-transparent mode. These internal PCI Express bridge devices 121 are connected to one another using one or more internal PCI or any other parallel busses 122. While FIG. 4 shows 8 PCI Express bridge devices 121, the number of bridges contained within a switch 120 is not limited. A peer to peer communication bus 125 may also be used.

As shown in FIG. 4, each link of the Virtual PCI Express Bridge 121 is configurable as Downstream port, which is tantamount to Transparent Bridge (TB) or alternately, as a Non Transparent Bridge (NTB). When a particular link is connected to PCI Express Endpoint or connected to another Switch 120 in the context of a hierarchy of Switch clusters, it is typically configured as Transparent Bridge (TB). When this link is connected to a server 110 and consequently its Root Complex Processor (RCP), it is typically configured as a Non Transparent Bridge (NTB). A NTB consists of two back-to-back PCI Express endpoints. A NTB allows the isolation of the two domains respectively belonging to the RCP of the server and the RCP connected to the upstream port of Switch 120.

In the TB mode, there are Base Address Register (BAR) and Limit Register that are used to direct PCI Express packets that have the starting address embedded as a field in the packet where data is to be accessed. Every port in the Switch that forms the links for the Switch 120 has its individual BAR and Limit Registers. These registers are initialized by the System software at boot time. The BARs and Limit Registers then direct the traffic to any other port of the Switch 120.

In NTB mode, there are extra hardware resources per port. In addition to BAR and Limit Registers there is Address Translation Registers that are implemented as a Look Up Table (LUT). This Address Translation Table allows for translating the starting address of PCI Read Or Write message coming from one side of the link to be modified going to the other side of the link.

Each link on the switch 120 represents a connection with one of these internal PCI Express bridge devices 121. The servers 110 RCP may each be attached to the respective NTB ports of switch 120. FIG. 3 shows two switches 120a, 120b, each in communication with three servers 110. However, the number of servers that can be served by a single switch is not limited by this disclosure. If the number of servers 110 that are to be clustered exceeds the number of ports available on the switch 120, multiple switches 120 may be used. For example, the upstream link of each switch 120 may be in communication with downstream link of another switch 120. If more than two switches 120 are needed, a hierarchy of switches may be employed, where each switch 120 is in communication with a central switch 130. The central switch 130 is then used to connect these switches 120 together.

Therefore, in operation, the CPU on the server 110a generates a message that it wishes to send to another node, such as server 110d. It creates the data payload, or application layer payload. In many embodiments, TCP/IP is used as the transport protocol. The message implies a starting address and subsequent data content embodied in a single packet. This message with its destination address is sent to the switch 120a. It enters switch 120a through a first internal PCI Express bridge device 121 (see FIG. 4). Switch 120a, typically using its Base Address Register (BAR) determines the destination of this message. The Switch 120A realizes the address of the message is not for any of the links supported by the Switch via its respective PCI Express Bridge. It then transmits the message out of switch 120a via a second internal PCI Express bridge device 121 in connection with the upstream link 124. Switch 120b receives the incoming message via another internal PCI Express bridge device 121, may store the incoming message, and determines which link is connected to server 110d. It then sends this message to that server 110d using another internal PCI Express bridge device 121. In this case, the message is delivered at wire speed, however, latency is incurred due to the fact that the message may be stored at the intermediate switches 120a, 120b. In this example, the message also passed through four different PCI Express bridge devices 121 between server 110a and server 110d.

However, if multiple transactions occur simultaneously that involve servers connected to different switches 120a, 120b, more latency may be incurred, as all of this traffic must pass through the single upstream connection in the switches 120a, 120b. This causes data to be held in FIFO and be subjected to some arbitration scheme after which it is allowed to use the path between the two Switches. In some embodiments, this congestion may be alleviated by increasing the bandwidth of this link. For example, in this embodiment, if the upstream link had a bandwidth of at least 3 times each downstream link, all communication would appear to be non-blocking between three servers connected to Switch 120a communicating simultaneously with 3 servers connected to Switch 120b in a round-robin arbitration method.

However, there are limits to the speeds that can be achieved on this upstream link 124. In addition, the storage requirements of the switch 120 may be tremendous, depending on the number of connected servers, compute and storage respectively, and the traffic generated by each. Therefore, it would be beneficial if there were an improved network switch and method of moving data between servers.

SUMMARY OF THE INVENTION

A network switch, based on the PCI Express protocol, is disclosed. The switch is in communication with a processor, local memory and includes a plurality of non-transparent bridges and, optionally transparent bridges leading to PCI Express endpoints. By configuring the non-transparent bridges appropriately, the network switch can facilitate communication between any two servers without needing to store any data in the local memory of the switch. For example, the network switch may configure the non-transparent bridges so as to have access to the physical memory of every server attached to it. It can then move data from the memory of any server to the memory of any other server.

DETAILED DESCRIPTION OF THE INVENTION

Usually, as described above, in a networked environment, there are various higher-level protocols used by the respective applications to communicate between computers and devices. For example, the TCP/IP protocol is used extensively in current intranet and internet infrastructure.

The technique/method used by the network switch described herein is totally transparent to the protocol used by the applications. In other words, applications running TCP/IP have no impact on this invention. The network switch provides an efficient method of transferring data at the physical layer and thus constitutes the data transport mechanism.

A new network switch utilizing PCI Express as the interconnection between servers is disclosed. This new network switch introduces a minimal amount of latency and requires no data storage.

One mechanism that has been used with PCI and PCI Express for a number of years is known as non-transparent bridging. A transparent bridge is a device in which the server, located on one side of the bridge is able to enumerate and communicate with devices on the other side of the bridge. In contrast, a non-transparent bridge does not allow that server to enumerate or communicate with devices on the other side of the non-transparent bridge (NTB). Instead, the NTB acts as an endpoint, which maps a section of memory (or I/O) on one side with a section of memory (or I/O) on the other side. The NTB performs address translation such that the sections of memory on the two sides of the bridge do not need to have the same addresses. Likewise, it performs ID translation to communicate with IO devices on other side of the bridge. Within the configuration space of the NTB are registers defined for message passing between the two sides. In addition, Doorbell Registers can be used to allow the devices on either side of the NTB to generate PCI Express in-band messaging interrupts to one another.

Figure 1:
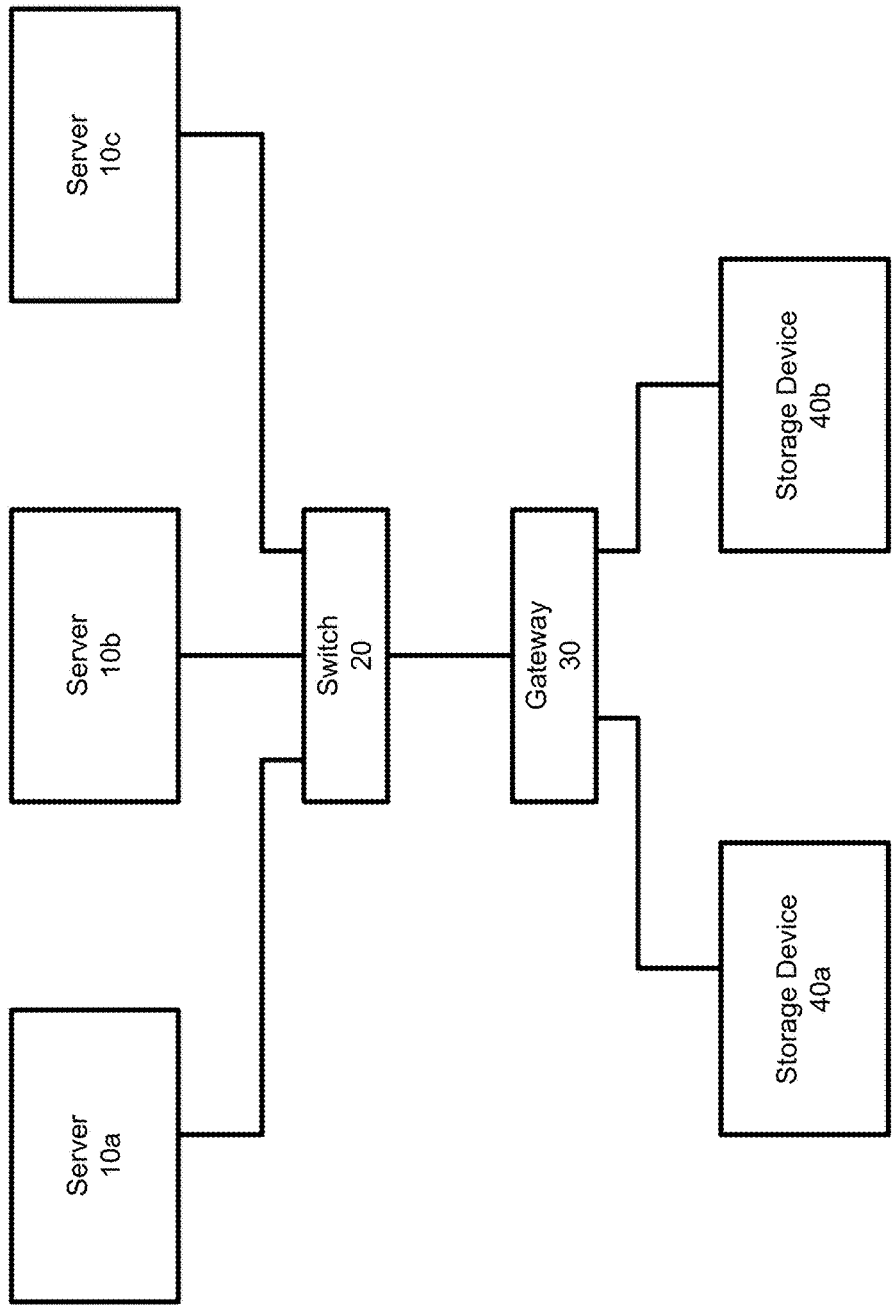
FIG. 1 is a first computer architecture of the prior art.
Figure 2:
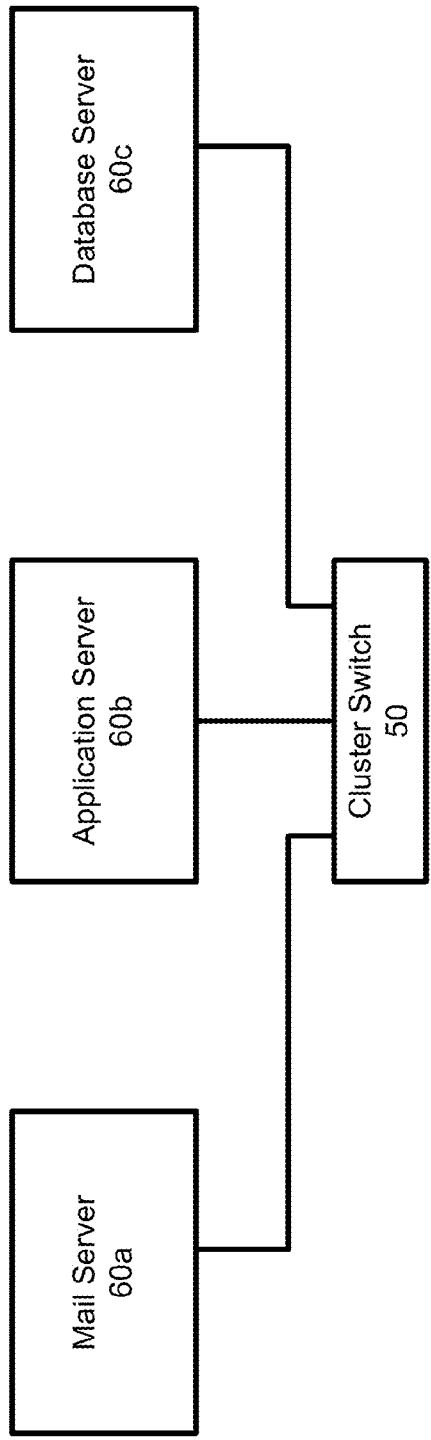
FIG. 2 is a second computer architecture of the prior art.
Figure 3:
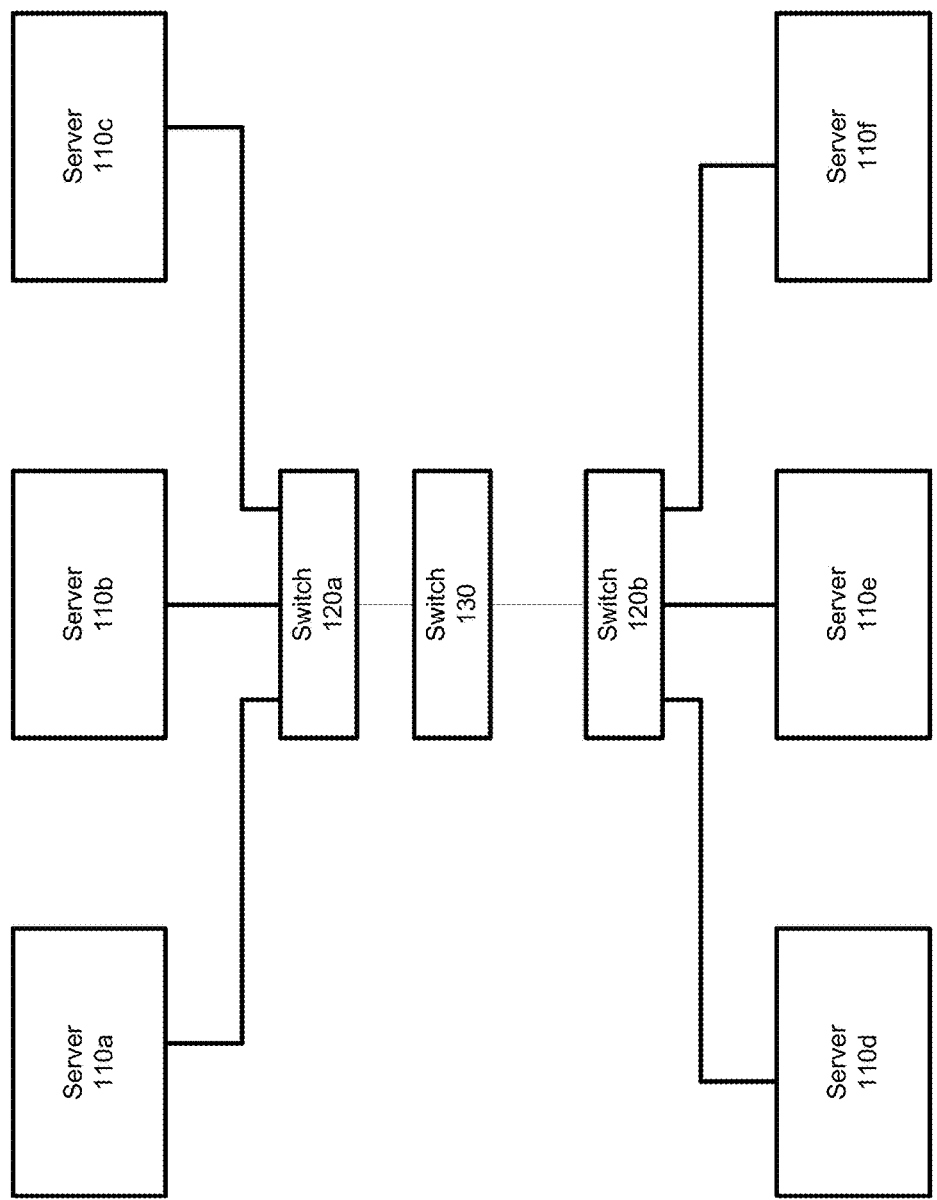
FIG. 3 is a switching architecture of the prior art.
Figure 4:
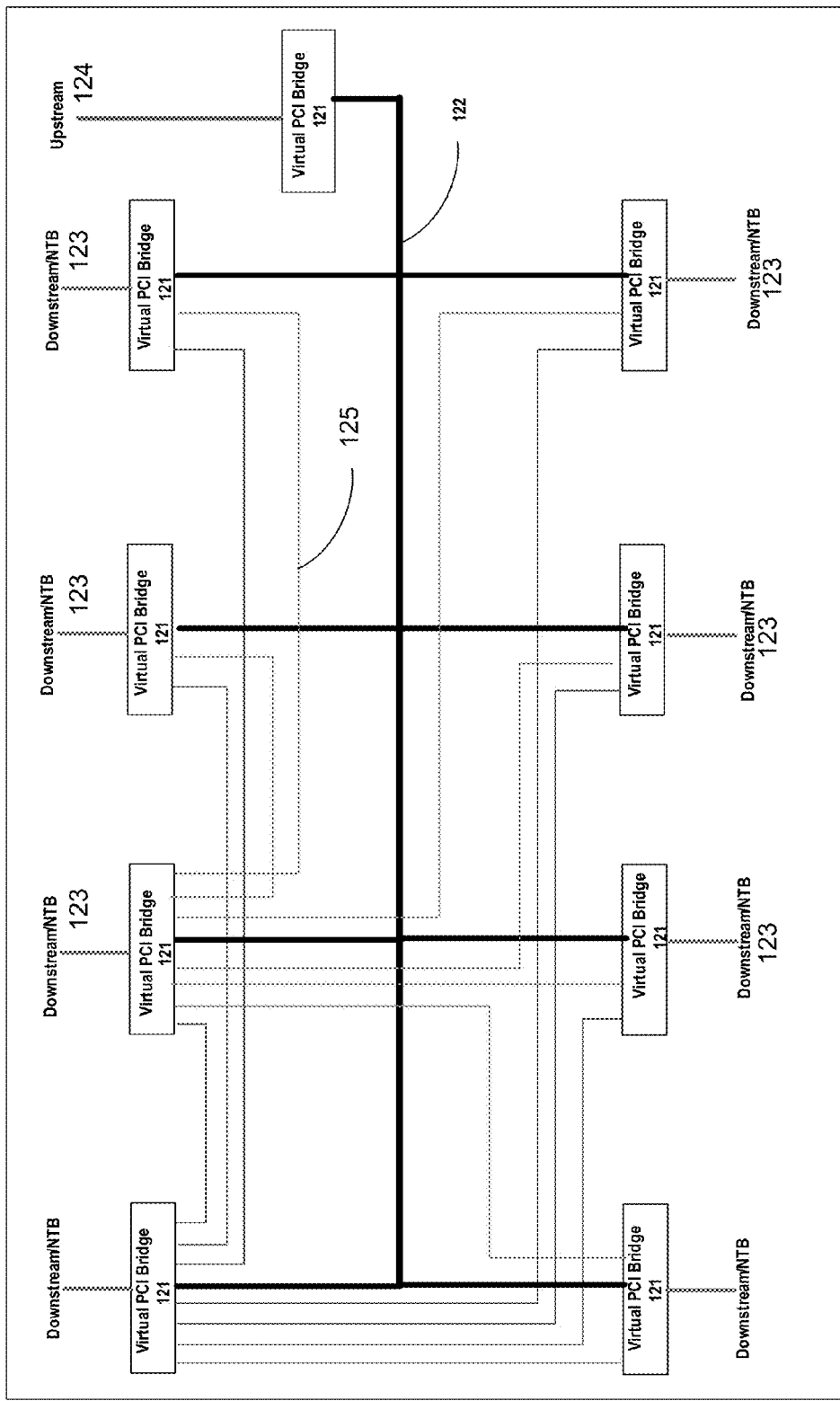
FIG. 4 shows a PCI Express switch of the prior art.
Figure 5:
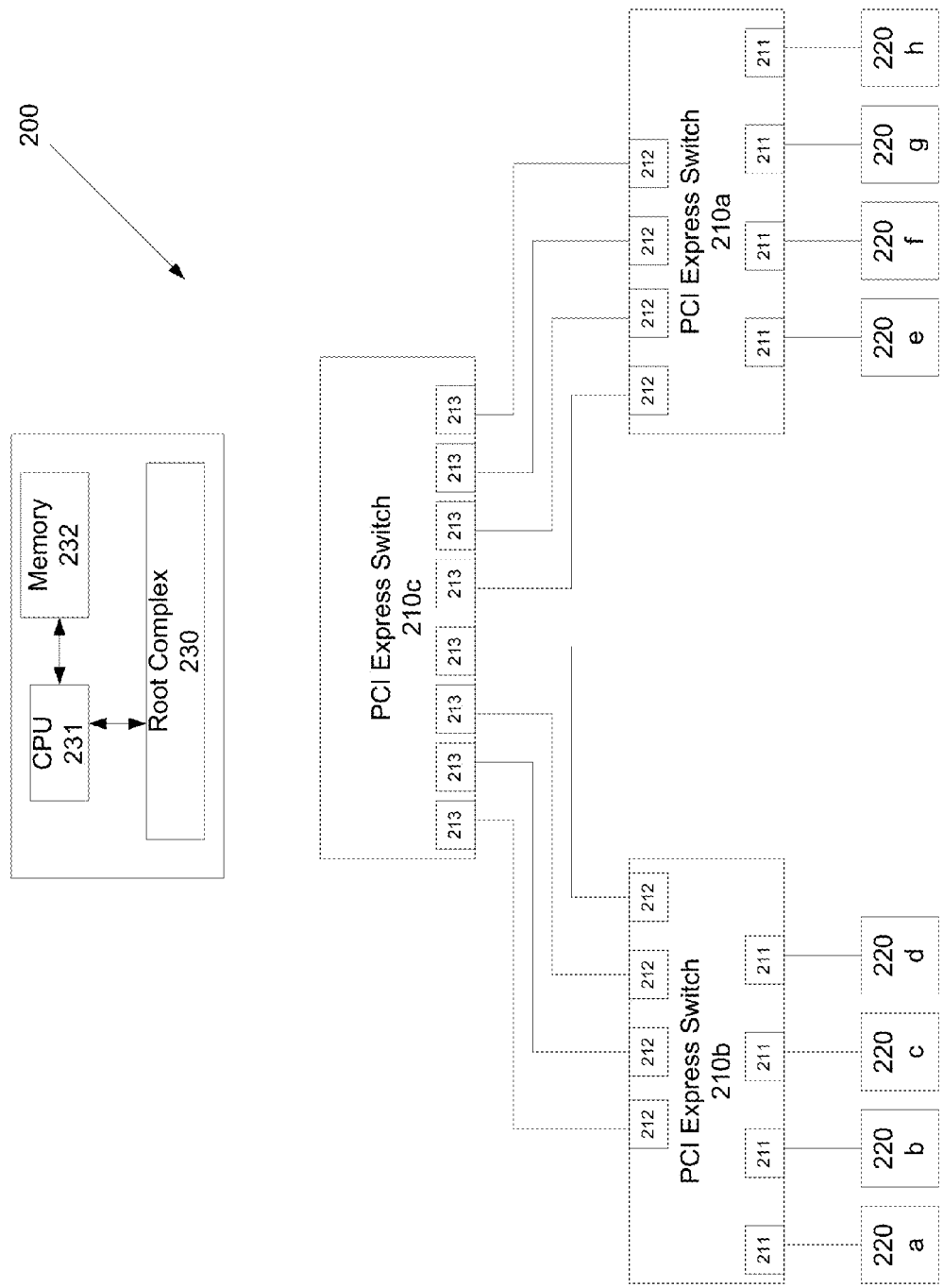
FIG. 5 shows a network switch according to one embodiment.

FIG. 5 shows a first embodiment of the network switch 200 of the present invention. The network switch 200 includes a plurality of PCI Express switches 210a-c, as were described in FIG. 4. Each of these PCI Express switches 210 has a plurality of internal non-transparent bridges 211 and a plurality of transparent bridges 212. While four of each of these bridges 211,212 are shown in FIG. 5, this number is not limited by the present disclosure. Two of these switches 210a-b are in communication with servers 220. These servers 220 are in communication with the non-transparent bridges 211 on each respective PCI Express switch 210.

Transparent bridges 212 are used to connect switches 210a-b to PCI Express switch 210c. In this embodiment, PCI Express switch 210c is not in direct communication with any servers 220. Since it is only in communication with other PCI Express switches 210a-b, it may be referred to as the central PCI Express switch.

However, in other embodiments, servers 220 may be in communication with one or more bridges within PCI Express switch 210c. PCI Express switch 210c connects to each transparent bridge 212 of PCI Express switches 210a-b using non-transparent bridges 213, as will be described in more detail below. Furthermore, while FIG. 5 shows PCI Express switches 210a-b connecting to PCI Express switch 210c using transparent bridges 212, it is understood that non-transparent bridges may also be used for this interconnect if they are connected to transparent bridges in PCI Express switch 210c.

In addition, while FIG. 5 shows two levels of PCI Express switches, the disclosure is not limited to this embodiment. Indeed any number of PCI Express switches 210 may be arranged using any desired number of levels of hierarchy. For example, 4 PCI Express switches may connect with servers and with 2 intermediate PCI Express switches. These intermediate PCI Express switches may each communicate with another PCI Express switch, which is only in communication with these intermediate PCI Express switches. In addition, there is no requirement that only two PCI Express switches 210a-b may feed into a third PCI Express switch 210c. A larger number of PCI Express switches may all merge into a single PCI Express switch 210c. The number of levels of PCI Express switches that are used is a function of the number of PCI bridges 211 needed to support the number of connections to servers or PCI Express endpoints, and the number of bridges supported by each PCI Express switch.

The network switch 200 is also in communication with a root complex 230, which may include a processing unit, or CPU, 231 and local memory 232. In some embodiments, the root complex 230 is disposed on the network switch 200. In other embodiments, the root complex 230 may be separate from the network switch 200. This local memory 232 may include instructions, which may be executed by the processing unit 231 to perform the functions described herein. The root complex 230 communicates with the PCI Express switches 210a-c, and is used to set up the configuration registers within each PCI Express switch 210a-c, as described in more detail below. The instructions may be written in any suitable language.

As is well known, PCI Express bridges utilize Base Address Registers (BARs), which establish the address range to which the PCI Express bridge is to respond, also referred to as the window. These BAR registers can be 32 bits or 64 bits, depending on the particular design implementation. In addition, the BAR registers also typically allow the address to be entered using "don't care" bits. In other words, a value of 1X0, indicates that the device to respond to addresses 100 or 110, since the middle bit is termed to be a "don't care" entity. In addition, PCI Express bridges also allow the user to specify the size of the window. This can be done using a size register, or may be implemented using a starting BAR and an ending BAR register or with BAR and Limit register combination. The specific implementation is not important; rather it is only important that the root complex can establish a window, having a starting address and a window size for each bridge 211, 212, 213 disposed in each PCI Express switch 210a-c.

The processing unit 231 determines the appropriate window address and size for each PCI Express bridge 211, 212, 213 in the network switch 200 to allow maximum transfer rates and minimum latencies.

In addition, each PCI Express switch 210 may have one or more DMA (direct memory access) engines associated with each PCI Express bridge 211 to allow automatic movement of data from a first or source address to a second or destination address. In other words, the processing unit 231 may configure the DMA engine to move a block of data, having a certain size, from a first address to a second address. Once configured, the DMA engine can automatically transfer the data without any additional intervention from the processing unit 231. However, in other embodiments, the processing unit 231 may move data between the source and destination addresses using its own resources.

For example, assume that a first of the transparent bridges (TBs) 212 in PCI Express Switch 210b had a BAR of 8000H, while a second TB in that PCI Express switch 210b had a BAR of A000H. A DMA transfer between address 8000H and address 4000H would cause the first TB 212 to recognize that the transfer involves its address space. It would then respond to this part of the transfer. Since the only address is not claimed by any of the other TBs 212, the destination of the transfer may be local memory 232 in the switch 200. In another example, a DMA transfer may be configured between address 8000H and address A000H. In this example, the first TB 212 may be the source of data, while the second TB represents the destination. In this example, the data is transferred between the TBs without being stored in physical memory on the switch 200.

Figure 6:
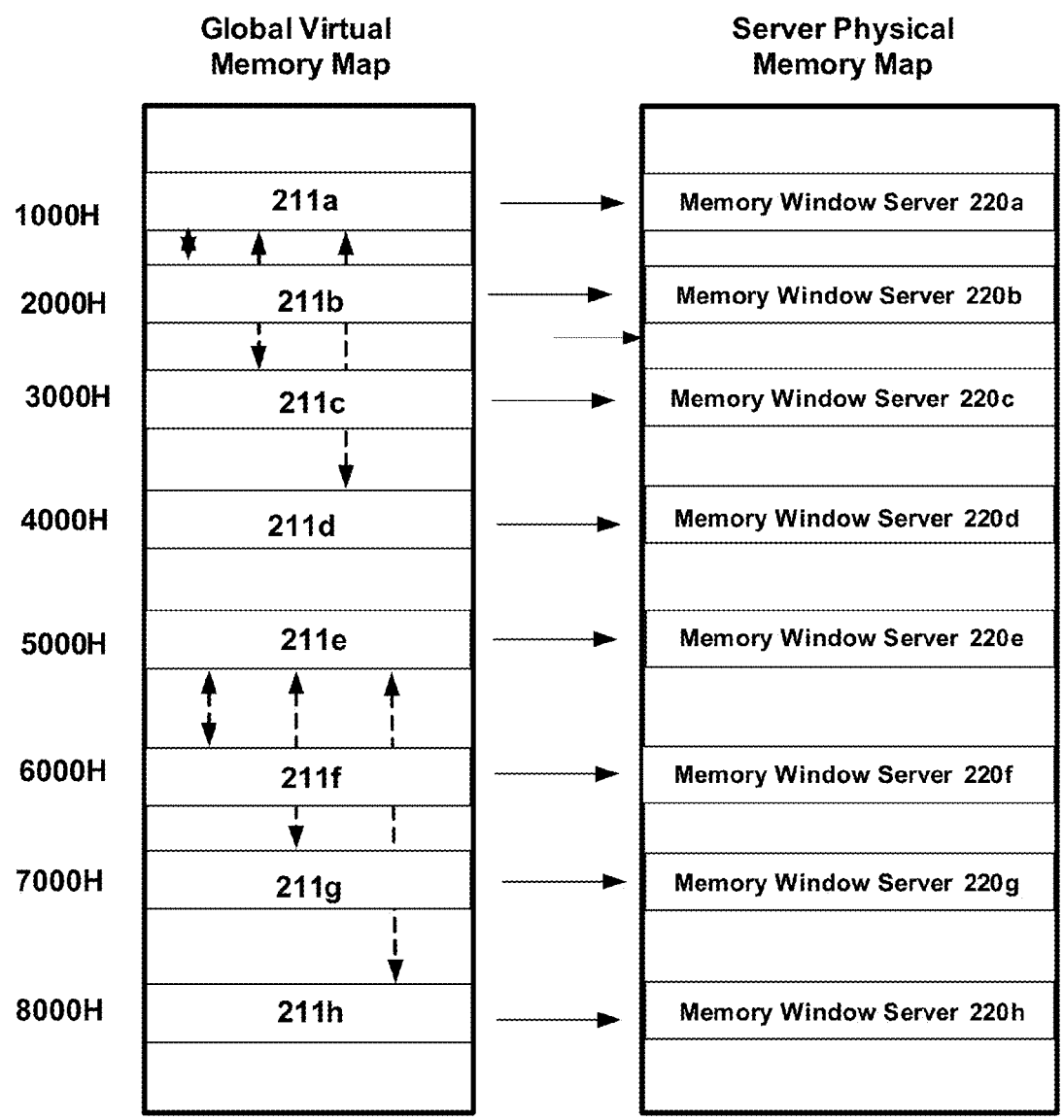
FIG. 6 shows an intra-switch global virtual memory map.

This concept can be expanded to allow access between any of servers 220a-d to any other of servers 220a-d. FIG. 6 shows an address map including the memory map of the switch 200 and the physical memory map of the servers 220a-d. In this example, each server has a physical memory window where messages that are transmitted and received from the PCI Express switch 210b are stored. For simplicity, it is assumed that the physical addresses in the servers correspond to the virtual addresses used by the PCI Express switch 210b using NTB address translation as discussed earlier. However, those skilled in the art easily recognize that address translation can be performed such that the server physical addresses and switch virtual addresses are different.

FIG. 6 shows eight address ranges and 8 servers. For purposes of this disclosure, these eight servers represent servers 220a-h (see FIG. 5). Additionally, while all of the servers are shown in one address map, it is understood that these servers may be split up among multiple switches. In this particular example, only server communication that occurs entirely within one PCI Express switch 210a,b, such as between any two of servers 220a-d or between any two of servers 220e-h is described. More complex transactions are described later.

To transfer data from Server 1 (see FIG. 5), which may be server 220a, to Server 4, which may be server 220d, the following steps may be taken. First, PCI Express switch 210b is configured such that a first of the NTB 211 (the one in communication with server 220a) is configured to respond to a first address range that begins at 1000H. A second NTB 211 (the one in communication with server 220d) is configured to respond to a second address range that begins at 4000H. A DMA operation is then set up which copies data from an address in the first address range to an address in the second address range. The read access to address 1000H will be responded to by the first NTB 211. This address is also the address of the physical memory located in server 220a. Thus, a read from address 1000H actually reads data directly from physical memory in server 220a. The write access to address 4000H will be responded to by the second NTB 211. As described above, this address is also the address used by the server 220d for inter-server communications. Thus, the data is actually written to physical memory in server 220d. Therefore, data can be moved between two servers 220a-d in communication with a single PCI Express Switch 210b without the need to store that data on the network switch 200.

As described above, NTBs 211 are used for this transaction, so the physical memory addresses used on the servers 220a-d may differ from those used in the virtual address map of the switch 200. For example, non-transparent bridges also contain look up tables (LUTs) which allow the translation of addresses between the entities on both sides of the NTB. In other words, the virtual address map of the switch shown is the server memory located at particular addresses (such as 1000H, 2000H, etc). In actuality, the servers 210 may use physical memory having a completely different address. In fact, the servers 220a-d may be configured such that the address of the physical memory used for inter-server communication is the same for all servers 220a-d.

Note that the technique described above is effective when the transaction is between servers 220 which are in communication with a common PCI Express switch 210a,b (see FIG. 4). However, a transaction between server 220a and server 220e cannot be performed in this manner, since the NTBs 211 which communicate with these respective servers do not share a common PCI or PCI Express bus. Stated differently, communications between server 220a and 220d occur because the NTBs associated with these two servers 220a,d share a PCI Express bus located within the PCI Switch 210b (see FIG. 4).

It is noted that the addresses used in this example are simply for illustrative purposes and are not limited by the disclosure. In addition, in some embodiments, the higher order bits of the addresses may be determined by the CPU 231 so that the data transfer occurs correctly, while the lower order address bits may represent the lower bits of the server's memory space. Of course, other translations are also possible.

Transactions between servers linked to different PCI Express switches 210a,b require coordination between all of the PCI Express switches 210a,b,c involved in the transaction.

Figure 7:
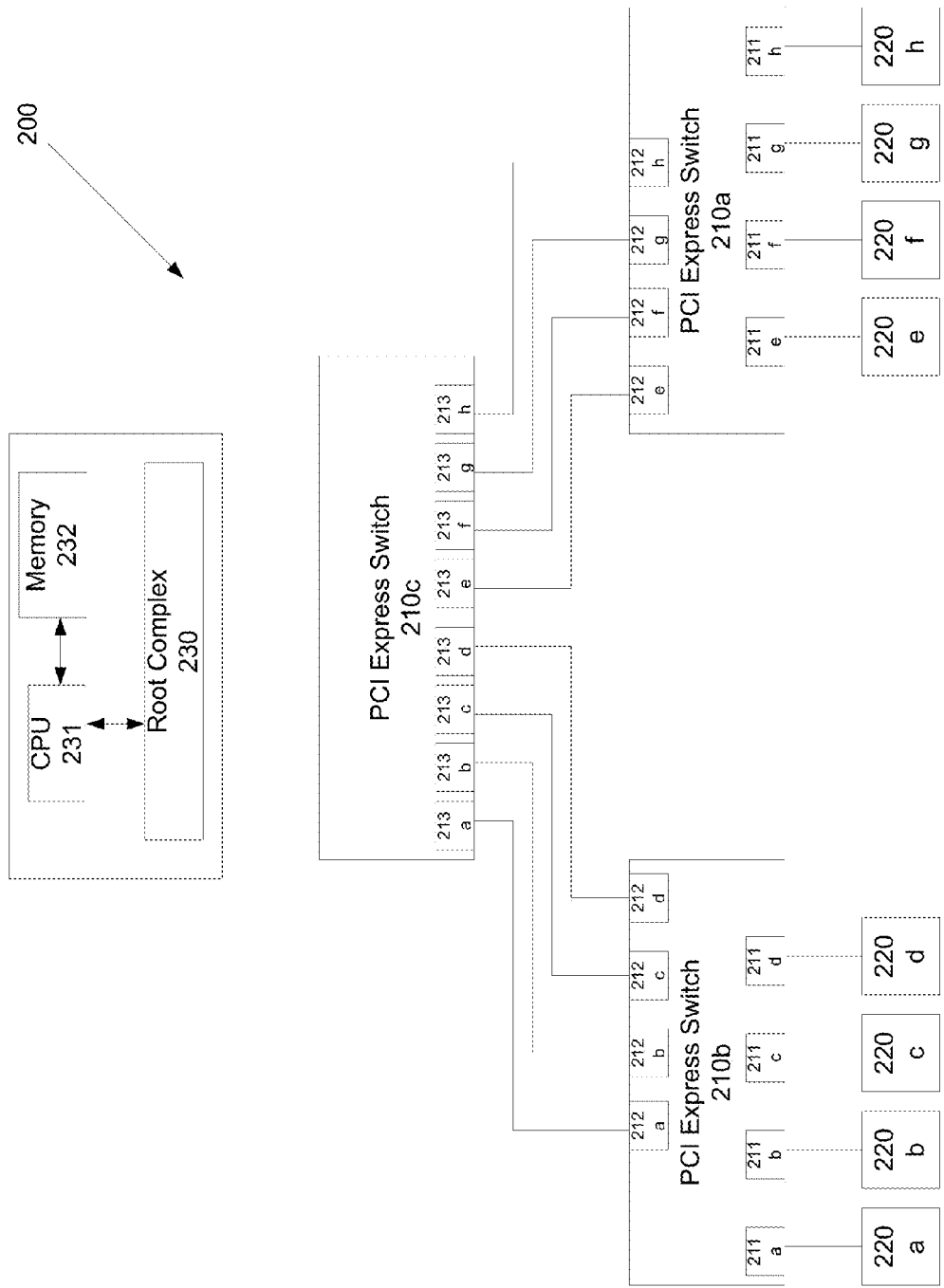
FIG. 7 shows a more detailed version of the network switch of FIG. 5.

For example, assume a transfer between server 220a and server 220g (see FIG. 7). Since these servers cannot communicate through a common PCI Express bus disposed within a PCI Express switch 210, a more complex method is required. In this example, 6 different PCI Express bridges, such as bridges 211a, 212a, 213a, 213g, 212g, 211g, may all be involved in this transaction. The present disclosure describes an addressing scheme by which a single DMA operation is transacted where all of these PCI Express bridges participate in the operation, and no data is stored on the network switch 200. This single operation does not need to be a DMA operation, rather it may be a memory move operation processed by the CPU 231. Of course, memory moves by the CPU 231 do not allow for concurrent operation since the CPU resources have to be shared, while DMA operations from dedicated DMA devices can operate concurrently. DMA operations may need to be initiated by respective DMA engines associated with individual ports 213a-h when data transfer is initiated between any server attached to switch 210b and another server attached to switch 210a. This may be because of the hierarchy of address mapping scheme as explained later.

To allow this addressing scheme to function properly, the address range assigned to each of the bridges 213a in PCI Express switch 210c is larger than the address ranges of the bridges disposed within PCI Express switches 210a,b. Furthermore, the address ranges of the bridges 211 in the PCI Express switch 210a,b have multiple "don't care" bits, as will be described in more detail below.

For purposes of simplicity and clarity of description, specific addresses may be assigned to various bridges in FIG. 7. Those skilled in the art will appreciate that the invention is not limited to these addresses, and other addresses can be used.

Each of the bridges 213a-h is assigned an address range. These address ranges are non-overlapping, and may be contiguous. However, the address ranges need not be contiguous. These address ranges may be of equal size; however, the size of the address space may be dependent on the number of servers which can ultimately be reached by that particular bridge 213. For example, in FIG. 7, each bridge 213 can access a set of 4 servers. Therefore, the address range assigned to each may be equal in size, although other embodiments are possible.

For simplicity, the following memory map may be used to address the PCI Express bridges 213 in the PCI Express Switch 210c:

TABLE 1

| PCI Express Bridge | Bit <63> | Bit <62> | Bit <61> |
|---|---|---|---|
| 213a | 0 | 0 | 0 |
| 213b | 0 | 0 | 1 |
| 213c | 0 | 1 | 0 |
| 213d | 0 | 1 | 1 |
| 213e | 1 | 0 | 0 |
| 213f | 1 | 0 | 1 |
| 213g | 1 | 1 | 0 |
| 213h | 1 | 1 | 1 |

Of course, other memory maps may also be used. Thus, any access destined for an address beginning with <000> will be responded to by bridge 213a. Likewise, any access for an address beginning with <101> will be responded to by bridge 213f.

The address ranges for PCI Express bridges 212 may be programmed to have the same address ranges as that of the associated PCI Express bridge 213 on PCI Express switch 210c. In other words, there may be a 1:1 correspondence between the size of the address range for PCI Express bridge 212e and PCI Express bridge 213e (and ever other pair of associated bridges 212, 213). In addition, there may be a 1:1 correspondence between the actual addresses used by the PCI Express bridge 212e and PCI Express bridge 213e (and ever other pair of associated bridges 212, 213). The address range in PCI Express bridges 212 can be smaller than the address range in corresponding PCI Express bridges 213.

The PCI Express bridges 211 each have an address range that may utilize bits that are not enumerated in the memory map shown in Table 1 above. Additionally, the PCI Express bridges 211 may each designate the bits used in Table 1 as "don't care" bits. In this way, the system uses the PCI Express bridges 213 to decode a first set of address bits, and uses the PCI Express bridges 211 to decode a second set of address bits, where these sets may not overlap. In this way, each address corresponds to a particular PCI Express bridge 213 and a particular PCI Express bridge 211. In one embodiment, the PCI Express bridges 211 are assigned address ranges in accordance with Table 2 below.

TABLE 2

| PCI Express bridge | Bit <63> | Bit <62> | Bit <61> | Bit <31> | Bit <30> |
|---|---|---|---|---|---|
| 211a | X | X | X | 0 | 0 |
| 211b | X | X | X | 0 | 1 |
| 211c | X | X | X | 1 | 0 |
| 211d | X | X | X | 1 | 1 |
| 211e | X | X | X | 0 | 0 |
| 211f | X | X | X | 0 | 1 |
| 211g | X | X | X | 1 | 0 |
| 211h | X | X | X | 1 | 1 |

In some embodiments, the PCI Express bridges 211 may decide additional address bits. For example, 3 bits may be used so that each PCI Express bridge 211 has a unique 3 bit address. In some other embodiments, the PCI Express bridges 211 may assign a specific value to one or more of the address bits used in Table 1.

Using the memory maps shown in Tables 1 and 2, it can be determined which PCI Express bridge 211 will respond to a particular address. Since these PCI Express bridges 211 connect directly to an associated server, the address actually indicates the server which the address is destined for. The memory map, based on FIG. 7 and Tables 1-2, is shown below:

TABLE 3

| Server | Bit <63> | Bit <62> | Bit <61> | Bit <31> | Bit <30> |
|---|---|---|---|---|---|
| 220a | 0 | X | X | 0 | 0 |
| 220b | 0 | X | X | 0 | 1 |
| 220c | 0 | X | X | 1 | 0 |
| 220d | 0 | X | X | 1 | 1 |
| 220e | 1 | X | X | 0 | 0 |
| 220f | 1 | X | X | 0 | 1 |
| 220g | 1 | X | X | 1 | 0 |
| 220h | 1 | X | X | 1 | 1 |

In this example, bits <62-61> are listed as "don't care" entities, since every combination of these two bits results in the same ultimate destination. For example, address <000, 00> (where the digits represent address bits <63-61,31-30> respectively) will utilize PCI Express bridges 213a, 212a and 211a to access Server 220a. Address <010,00> will utilize PCI Express bridges 213c, 212c and 211a to access Server 220a. In other words, in this example, bit <63> is used to select a particular PCI Express switch 210a,b, and address bits <31-30> select a particular PCI Express bridge 211 on that PCI Express switch 210a,b.

Therefore, any of the remaining address bits may be used for other purposes if desired. For example, in one embodiment, address bits <62-61> may be used to designate the other switches 213a-213d or 213e-213h depending on state of <63> involved in the transaction. For example, the following table may represent addresses associated with Server 220e.

TABLE 4

| Other Server in Transaction | Bit <63> | Bit <62> | Bit <61> | Bit <31> | Bit <30> |
|---|---|---|---|---|---|
| 220a | 1 | 0 | 0 | 0 | 0 |
| 220b | 1 | 0 | 1 | 0 | 0 |
| 220c | 1 | 1 | 0 | 0 | 0 |
| 220d | 1 | 1 | 1 | 0 | 0 |

Note that only servers 220 which are attached to the other PCI Express switch 210b are included in this address table. Transactions between servers connected to the same PCI Express Switch 210a may not utilize the global address scheme addressed herein, as those transactions occur entirely within PCI Express switch 210a. In some embodiments, the need for using Global Addressing is to facilitate software development where data transfer between any two servers can be reduced to exchange of data between two unique memory segments in the global address space. In that sense, transactions involving data exchange with a particular switch may need to be part of the global addressing scheme.

The attached table shows a complete memory map for the system of FIG. 7, including source and destinations of each transaction.

TABLE 5

| Description | Bit<63> | Bit<62> | Bit<61> | Bit<31> | Bit<30> |
|---|---|---|---|---|---|
| 220a (to/from 220e) | 0 | 0 | 0 | 0 | 0 |
| 220a (to/from 220f) | 0 | 0 | 1 | 0 | 0 |
| 220a (to/from 220g) | 0 | 1 | 0 | 0 | 0 |
| 220a (to/from 220h) | 0 | 1 | 1 | 0 | 0 |
| 220b (to/from 220e) | 0 | 0 | 0 | 0 | 1 |
| 220b (to/from 220f) | 0 | 0 | 1 | 0 | 1 |
| 220b (to/from 220g) | 0 | 0 | 1 | 0 | 1 |
| 220b (to/from 220h) | 0 | 0 | 1 | 0 | 1 |
| 220c (to/from 220e) | 0 | 0 | 0 | 1 | 0 |
| 220c (to/from 220f) | 0 | 0 | 1 | 1 | 0 |
| 220c (to/from 220g) | 0 | 1 | 0 | 1 | 0 |
| 220c (to/from 220h) | 0 | 1 | 1 | 1 | 0 |
| 220d (to/from 220e) | 0 | 0 | 0 | 1 | 1 |
| 220d (to/from 220f) | 0 | 0 | 1 | 1 | 1 |
| 220d (to/from 220g) | 0 | 1 | 0 | 1 | 1 |
| 220d (to/from 220h) | 0 | 1 | 1 | 1 | 1 |
| 220e (to/from 220a) | 1 | 0 | 0 | 0 | 0 |
| 220e (to/from 220b) | 1 | 0 | 1 | 0 | 0 |
| 220e (to/from 220c) | 1 | 1 | 0 | 0 | 0 |
| 220e (to/from 220d) | 1 | 1 | 1 | 0 | 0 |
| 220f (to/from 220a) | 1 | 0 | 0 | 0 | 1 |
| 220f (to/from 220b) | 1 | 0 | 1 | 0 | 1 |
| 220f (to/from 220c) | 1 | 1 | 0 | 0 | 1 |
| 220g (to/from 220d) | 1 | 1 | 1 | 0 | 1 |
| 220g(to/from 220a) | 1 | 0 | 0 | 1 | 0 |
| 220g(to/from 220b) | 1 | 0 | 1 | 1 | 0 |
| 220g(to/from 220c) | 1 | 1 | 0 | 1 | 0 |
| 220g(to/from 220d) | 1 | 1 | 1 | 1 | 0 |
| 220h(to/from 220a) | 1 | 0 | 0 | 1 | 1 |
| 220h(to/from 220b) | 1 | 0 | 1 | 1 | 1 |
| 220h(to/from 220c) | 1 | 1 | 0 | 1 | 1 |
| 220h(to/from 220d) | 1 | 1 | 1 | 1 | 1 |

Note that by using this scheme, a first subset of address bits is used to identify the first set of servers (i.e. Bits <63,31-30>) and a second subset of address bits is used to identify the second set of servers (i.e. Bits <62-61>) involved in the transfer. Using this scheme each server communicates with each other server using a unique address. This allows multiple DMA transactions to occur simultaneously as unique addresses will be used for each transaction. DMA operations are initiated by PCI Bridges 213a-h as indicated by 'from' servers mentioned in Table 5.

In addition, the choice of addresses also allows for 4 simultaneous transactions to occur since each set of servers utilizes a unique set of PCI bridges. The address scheme described above is simply one embodiment. Other address schemes can be used to define a global address map where transactions between any two servers occur using a unique address range.

At startup or initialization, the CPU 231 configures the registers within each PCI Express bridge within each PCI Express switch 210. These registers include those described above, such as BAR registers and other configuration registers. After initialization, the address map shown above is incorporated into the network switch 200 such that all transfers occur as described above.

This methodology can be used to scale up the number of servers supported by augmenting this configuration with additional levels of intermediate switches. The level of levels required is determined by number of servers to be supported and the number of PCI Express bridges embedded in each PCI Express switch.

Next, the process by which transfers are initialized will be described. When one server, such as server 220a wants to send or receive data from another server, such as server 220d, it may send a message to the network switch 200. This message may utilize a known protocol, such as TCP/IP or may be unique to these network switches 200. The actual mechanism and protocols used to deliver this message are not limited by the present invention. The CPU 231 receives this message and decodes it to determine the transfer parameters. These parameters may include the starting address in server 220a memory, the starting address in server 220d memory, and the byte count of the desired transfer. Once this information is determined, the CPU 231, utilizing the address memory established above, configures the source address, destination address and byte count in one of the DMA controllers in PCI Express Switch 210c. The transfer then takes place and data is moved between the servers 220a, 220d without further intervention from CPU 231. In addition, the transfer occurs without the need to store any of the data on network switch 200.

When using switch 210c to move data between servers, appropriate DMA engines associated with respective bridges 213a-213h are used. However, when using switches 210a or 210b to move data between servers appropriate DMA engines associated with respective bridges 211a-211h are used.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes.

What is claimed is:

1. A method of transmitting information between a plurality of servers, each server having a local memory and processor, comprising:
connecting each of said plurality of servers to a network switch using PCI Express, said network switch comprising a central PCI Express switch and a plurality of PCI Express Switches, each of said PCI Express Switches in communication with at least one of said plurality of servers via a respective non-transparent bridge disposed in said PCI Express switch and also in communication with said central PCI Express Switch via a plurality of transparent bridges disposed in said PCI Express Switch, wherein said central PCI Express switch is in communication with said plurality of PCI Express switches using a plurality of non-transparent bridges disposed in said central PCI Express switch;
configuring each of said non-transparent bridges in said central PCI Express switch, each of said transparent bridges in said plurality of PCI Express switches and each of said non-transparent bridges in said plurality of PCI Express switches such that there is a unique set of PCI bridges used for communications between any two servers connected to said network switch.

2. The method of claim 1, further comprising a processing unit in communication with said network switch, wherein said processing unit uses a unique address range to denote a source server and a destination server for a transmission.

3. The method of claim 2, further comprising configuring a DMA engine to transfer said information from said source server and said destination server.

4. The method of claim 3, wherein said DMA engine is disposed in said central PCI Express switch.

5. The method of claim 3, wherein said source server is connected to a different PCI Express switch than said destination server.

6. The method of claim 2, wherein each non-transparent bridge in said central PCI Express switch comprising a Base Address register which comprises an address range assigned thereto, said address range comprising a first set of address bits that are assigned a predetermined value and a second set of address bits that are assigned a "don't care" status.

7. The method of claim 6, wherein Base Address Registers in said transparent bridges in said PCI Express switches each have an address range assigned thereto, wherein said second set of address bits of said address range are assigned a predetermined value.

8. A method of transmitting information between a source server and a destination server, each of said servers having a local memory and processor, comprising:
connecting said source server to a first port of a network switch, said network switch comprising of at least one central PCI Express switch and a plurality of PCI Express Switches, via a first non-transparent bridge disposed in a first PCI Express switch;
connecting said destination server to a second port of said network switch, via a second non-transparent bridge disposed in a second PCI Express switch;
connecting said first and second PCI Express switches to separate ports on said central PCI Express switch via a plurality of transparent and non-transparent PCI Express bridges, wherein a non-transparent bridge is disposed in said central PCI Express switch at each of said separate ports; and
configuring a DMA engine disposed in said central PCI Express switch to transfer said information from said source server to said destination server.

9. The method of claim 8, wherein one or more intermediate PCI Express switches are disposed between said first PCI Express switch and said central PCI Express switch.

10. The method of claim 8, wherein each of said transparent PCI Express bridges has one or more configuration registers, defining a starting address and an address range.

11. The method of claim 10, wherein said address ranges are non-overlapping.

12. The method of claim 10, wherein said non-transparent PCI Express bridges disposed in said central PCI Express switch use a first set of address bits to define said address range; and said transparent PCI Express bridges disposed in said PCI Express switches use a second set of address bits, different than said first set of address bits, to define said address range.

13. The method of claim 8, further comprising a third server in communication with a third port on said first PCI Express switch and a fourth server in communication with a fourth port on said second PCI Express switch, and configuring a second DMA engine disposed in said central PCI Express switch to transfer information from said third server and said fourth server; wherein said DMA engine and said second DMA engine operate concurrently.

14. A method of transmitting information between a source server and a destination server, each of said servers having a local memory and processor, comprising:
connecting said source server to a first port of a network switch via a first non-transparent bridge, said network switch comprising a plurality of PCI Express bridges, arranged in a plurality of hierarchical levels;
connecting said destination server to a second port of said network switch, via a second non-transparent bridge;
connecting each of said first and second non-transparent bridges to a respective first and second transparent PCI Express bridges, respectively;
connecting each of said first and second transparent PCI Express bridges to a respective third and fourth non-transparent PCI Express bridges; and
assigning said third non-transparent bridge a first address range, wherein said first address range includes a first set of address bits set to a first predetermined value and a second set of address bits set to "don't care" status;
assigning said fourth non-transparent bridge a second address range, wherein said second address range includes said first set of address bits set to a second predetermined value and said second set of address bits set to "don't care" status;
assigning said first transparent bridge a third address range wherein said third address range includes said second set of address bits set to a third predetermined value;
assigning said second transparent bridge a fourth address range wherein said fourth address range includes said second set of address bits set to a fourth predetermined value;
configuring a DMA engine to transfer said information from said source server to said destination server, wherein addresses used by said DMA engine are based on said first and second sets of address bits and said first, second, third and fourth predetermined values.

15. The method of claim 14, wherein said third address range and said fourth address range include said first set of address bits set to "don't care" status.

16. The method of claim 14, wherein said first and second non-transparent PCI Express bridges are disposed in a first and second respective PCI Express switch; and said third and fourth non-transparent PCI Express bridges are disposed in a central PCI Express switch.

17. The method of claim 16, wherein said first set of address bits is used to select one of said first and second PCI Express switches.

18. The method of claim 16, wherein said second set of address bits is used to select one of said ports on said first and second PCI Express switches.

* * * * *